United States Patent Office 3,558,550
Patented Jan. 26, 1971

3,558,550
SINTERINGS OF POLYTETRAFLUOROETHYLENE LOADED WITH TITANIUM AND THE PREPARATION THEREOF
Guiseppe Zuliani, Merano, and Miniato Socci, Milan, Italy, assignors to Montecatini Edison S.p.A., Milan, Italy, a corporation of Italy
No Drawing. Filed Jan. 24, 1968, Ser. No. 700,033
Int. Cl. C08f 45/04
U.S. Cl. 260—41                              2 Claims

ABSTRACT OF THE DISCLOSURE

Described are sinterings of polytetrafluoroethylene loaded with titanium and the preparation thereof. Said sinterings are useful for the construction of mechanical elements having high anticorrosive characteristics coupled with mechanical properties superior to those of the nonimpregnated polytetrafluoroethylene sinterings.

Also described is the preparation of sinterings of polytetrafluoroethylene resins loaded with titanium. This process is characterized by the following steps:

Preliminary mixing of the polytetrafluoroethylene resin powder, having a granulometric size of between $0.25\mu$ and $600\mu$, and metallic titanium micropowder with a granulometric size between $40\mu$ and $200\mu$, in a ratio varying from 10–50% by weight of titanium with respect to the mixture. Preforming the mixture with a volume reduction of about 4:1, by compression in suitable molds at a pressure comprised between 4000 and 6000 kg./cm.$^2$. Sintering the compacted mixture by slowly heating in an oven, to a temperature between 300° and 450° C. for from 1 to 3 hours. And gradually cooling down the sintering to room temperature in order to avoid deformations and cracks.

---

The present invention concerns sinterings of polytetrafluoroethylene resins loaded with titanium and a process for the preparation thereof.

It is known that in the processing of polytetrafluoroethylene and similar resins, the molding and extrusion techniques differ considerably from those used for thermoplastic resins typical of the traditional plastic materials.

One obtains from the polymerization of tetrafluoroethylene, white granular powders that soften at about 300° C. and begin decomposing with the formation of volatile materials around 400° C. Because of these properties, it is necessary to use sintering techniques if this polymer is to be used for the construction of mechanical elements. That is, the required elements are obtained through the simultaneous action of heat and pressure.

Polytetrafluoroethylene is characterized by an extreme chemical inertness since it can be attacked only by alkaline metals, while acids, alkalis and solvents do not cause any variation in its properties. Polytetrafluoroethylene possesses a good resistance to pressure and maintains these good properties over a wide range of temperatures. Nevertheless, this resin, under a steady load (stress), suffers an appreciable deformation which, however, tends to disappear upon cessation of the load or stress. This deformation, however, becomes much more evident as the operational temperature of the mechanical element made of this resin rises, while its "elastic memory," i.e. capacity or property to take up again its original dimensions, decreases.

We have now found that by using micropowders of metallic titanium as a filling material in the polytetrafluoroethylene resins, it is possible to overcome these drawbacks of deformation, to improve considerably the mechanical characteristics of the polytetrafluoroethylene sinterings, and to increase their resistance to wear, consequently increasing the linear velocity of the rotating mechanical elements.

Since the polytetrafluoroethylene resin withstands the attack of many chemical products, the titanium charge, in substitution of conventional copper and silver charges, is much more efficient for improving the corrosion resistance. Thus the sinterings obtained according to our invention can find their application in the manufacture of bearings under heavy stress and subject, for instance, to the attack by sea water.

The percentage of titanium charge in the resin varies between 10% and 50% with respect to the mixture and depends upon the use to which the sintering is being put, in particular it depends upon the mechanical stresses to which it is to be subjected and on the environment conditions wherein it has to operate. The charge of titanium powder, besides increasing the density, which in the case of sintering constituted by 50% by weight of resin and by 50% by weight of titanium passes from 2 to 2.8, increases also the Brinell hardness to a value comprised between 4.6 and 4.8 HB for a sphere of 10 mm. diameter, charged with 150 kg. for 30 seconds compared to the hardness of 2.06 kg./mm.$^2$ of the pure resin.

In general, titanium shows a corrosion resistance superior to that of traditional materials (bronze, copper, etc.) and, in spite of its specific low weight, offers a mechanical resistance which is at least equal to that of conventional metals, even at high temperatures. Thus, the sinterings made from resins loaded with titanium according to this invention, are of particular interest for those devices intended to operate in acid environments, in sea water, in oily mixtures, etc., where they are subject to considerable stresses and exposed to wear as well as to corrosion, fretting or deformation.

The transformation of the powders according to this invention, whether achieved by extrusion or heated screw extruders or by compression molding, is through a three-stage operational cycle: preforming, sintering and cooling. In particular the process is characterized by the following operational stages, in the given order:

(a) Preliminary mixing of the polyeterafluoroethylene powder with a granulometry between $0.25\mu$ and $600\mu$ with titanium powder with a granulometry between $40\mu$ and $200\mu$, the quantity by weight of titanium being between 10% and 50% with respect to the mixture;

(b) Preforming of the mixture in compresson molds at a pressure between 4000 and 6000 kg./cm.$^2$, at room temperature, in order to obtain a reduction in volume of the mixture, depending on the piece to be made, with a volume decrease generally around 4:1;

(c) Sintering the preformed mixture by gradual heating, in an oven, to a temperature comprised between 300° and 450° C., and holding this temperature for from 1 to 3 hours; and (d) Gradually cooling down the sintering to room temperature.

By the preforming operation, the granular powder is subjected to a pre-established reduction in volume varying in accordance with the characteristics of the piece to be manufactured.

The subsequent sinterization operation results in the formation of bonds between the adjacent surfaces of the particles constituting the resin. The cooling, which occurs within the mold under pressure, constitutes the final operation of the transformation cycle and is of considerable importance since the variations in the density of the material, the compactness of the same and finally the percentage of machine shop rejects due to cracks and deformations depend upon its velocity.

The sinterings made of polytetrafluoroethylene resin loaded with titanium powder may find convenient applications in the manufacture of guiding sleeves and bushings; they are suited for locking mechanisms for sluice gates in which the metal pins have the tendency to jam because of humidity and the dirty environment in which they operate; they are also suited for sliding contacts required in the control of mine winches generally cooled by water mixed with slime.

Gears made from titanium loaded resins constitute gear couples of maximum lightness and low friction coefficient.

The sinterings of resins with high contents percentages of metal titanium are suited for supporting considerable loads running at limited linear velocities. Their use is advisable wherever short but considerably intense stresses are to be met. Thus, they are suited for water cooled rolls of roll mills for metals, instead of bearings of hard wood or of other resins liable to swell or crack. The resin, loaded with titanium powders and sintered, constitutes an excellent lining for large sectioned bearings for propeller shafts of vessels of considerable tonnage, cooled by sea water. These bearings, fitted also to deck windlasses, can run at high speeds under considerable but constant loads, provided they are cooled by sea water.

The following examples are given for illustrative and exemplifying purposes of the preparation of sinterings. The tests compare our invention with conventional sinterings. These examples are not to be limitative of the protective scope of this invention.

EXAMPLE 1

1 kg. of a polytetrafluoroethylene resin powder, with a granulometry of 300$\mu$, was mixed in a rotating mixer at room temperature together with 1 kg. of titanium powder having a granulometric size of 44$\mu$. This mixture was then molded into cylinders with a diameter of 32 mm., and a height of 40 mm., at a pressure of 4000 kg./cm.$^2$. The pressing was then removed from the mold and subjected to sintering at 360° C. for about 1 hour. The sintered product was then gradually cooled down to room temperature. Its density turned out to be 2.82 and the hardness (Brinell 10/150/30) equalled 4.8 kg./mm.$^2$.

The product thus obtained was machined on a machine tool to produce bushings that were then subjected to a wear test at a rotational speed of 550 r.p.m. (revolutions per minute) on a stainless steel shaft.

Following the same technical procedures and with the same starting polytetrafluoroethylene resin, bushings were made respectively from pure resin and from a resin loaded with 50% of copper powder.

The following table shows the results of the comparative tests between bushings of titanium loaded polytetrafluoroethylene and bushings of the conventional type.

|  | Bushing from pure polytetrafluoroethylene resin | Bushing from polytetrafluoroethylene loaded with 50% of Ti according to the invention | Bushing from polytetrafluoroethylene loaded with 50% of copper powder |
|---|---|---|---|
| Material | (1) | (2) | (3) |
| Starting weight, grams | 65,200 | 70,700 | 62,600 |
| Checks after hours of running | 96 | 262 | 19 |
| Initial measurements, diameter | 19.75 x 32.1 x 43 | 19.75 x 32.0 x 40 | 19.75 x 32.1 x 32.2 |
| Ovalities | 20.5–24.5 | 19.90 | 19.90–22.50 |
| Final weight, grams | 59,400 | 70,680 | 58,770 |
| Loss of weight, percent | 8.89 | 0.028 | 6.11 |
| Distributed mean load | 1.50 | 1.50 | 1.50 |

[1] Extruded rod.
[2] Molding at a pressure of 3,790 kg./cm.$^2$, at a sintering temperature of 360° C. for 1 hour.
[3] Molding at a pressure of 3,700 kg./cm.$^2$, at a sintering temperature of 360° C. for 1 hour.

From the preceding table the comparative results evidence quite clearly the better mechanical properties of the sinterings obtained according to this invention, particularly with reference to the wear and the deformation of the manufactured goods. By ovalities is meant the degree of out of round.

EXAMPLE 2

Comparative tests were carried out on 19.5 x 29.5 x 36 mm. sleeves and guide bushings made of sinterings according to this invention, obtained by sintering of polytetrafluoroethylene resin powders having a granulometric size of 300$\mu$, intimately mixed up to 50% with metallic titanium powders and preformed at a pressure of 5000 kg./cm.$^2$. After 400 hours of running on an apparatus rotating at a uniform speed of 550 r.p.m. and refrigerated by sea water, a loss in weight was found of 0.034% against 8.92% found, under the same test conditions, on a bushing made of non-loaded virgin resin.

EXAMPLE 3

1 kg. of powdery polytetrafluoroethylene filings of a granulometric size of 200$\mu$ was mixed in a rotary mixer with titanium powder having a granulometric size below 50$\mu$. From this mixture were molded cylinders with 28.7 mm. diameter, 24.6 mm. height and weighing 39.5 grams, under a pressure of 5000 kg./cm.$^2$. The pressings, removed from the molds, were sintered for 1 hour at a temperature of 360° C. Subsequently, the product was cooled slowly and then worked on a machine tool to give a product with a Brinell hardness of 4.6 kg./cm.$^2$.

This application is related to our copending application Ser. No. 699,995, filed concurrently herewith. Any pertinent details therein are incorporated herein by reference.

We claim:

1. A process for the preparation of sinterings of polytetrafluoroethylene resin loaded with titanium, which comprises
    (a) preliminary mixing of polytetrafluoroethylene resin power, having a granulometric size between 0.25$\mu$ and 600$\mu$, and metallic titanium micropowder having a granulometric size between 40$\mu$ and 200$\mu$, with from 10 to 50% by weight of titanium with respect to the mixture;
    (b) preforming the mixture with a volume reduction of 4:1, by compression in suitable molds at a pressure between 4000 and 6000 kg./cm.$^2$;
    (c) sintering the compacted mixture by means of slowly heating up until reaching a temperature between 300° and 450° C. for from 1 to 3 hours; and (d) grandually cooling down the sintering to room temperature in order to avoid deformations and cracks.

2. Sinterings obtained according to the process of claim 1, comprising polytetrafluoroethylene loaded with from 10 to 50% by weight titanium with respect to the mixture.

References Cited

UNITED STATES PATENTS

| | | | |
|---|---|---|---|
| 2,400,099 | 5/1946 | Brubaker | 260—41A |
| 2,782,180 | 2/1957 | Weidman | 260—41 |
| 2,928,733 | 3/1960 | Wagner | 75—221 |

OTHER REFERENCES

Chem. Abstract, vol. 52, 13603a, "Corrosion-Resistant Copper Alloys."

MORRIS LIEBMAN, Primary Examiner

T. MORRIS, Assistant Examiner